United States Patent
Lombardi et al.

(10) Patent No.: US 12,552,205 B2
(45) Date of Patent: Feb. 17, 2026

(54) RADIO-FREQUENCY IDENTIFICATION (RFID) DEVICE TO BE INSERTED IN A TIRE

(71) Applicant: Bridgestone Europe NV/SA [BE/BE], Zaventem (BE)

(72) Inventors: Roberto Lombardi, Rome (IT); Maria Cecilia Palumbi, Rome (IT); Guido Lippiello, Rome (IT); Cristian Capaldi, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 167 days.

(21) Appl. No.: 18/580,220

(22) PCT Filed: Jul. 25, 2022

(86) PCT No.: PCT/EP2022/070826
§ 371 (c)(1),
(2) Date: Jan. 18, 2024

(87) PCT Pub. No.: WO2023/006680
PCT Pub. Date: Feb. 2, 2023

(65) Prior Publication Data
US 2024/0326521 A1     Oct. 3, 2024

(30) Foreign Application Priority Data

Jul. 26, 2021   (IT) .................. 102021000019853

(51) Int. Cl.
*B60C 19/00*     (2006.01)
*H01Q 1/22*     (2006.01)

(52) U.S. Cl.
CPC .......... *B60C 19/00* (2013.01); *H01Q 1/2225* (2013.01); *H01Q 1/2241* (2013.01)

(58) Field of Classification Search
CPC .... H01Q 1/2241; B60C 5/14; B60C 23/0493; B60C 19/00; B60C 13/00
See application file for complete search history.

(56) References Cited

U.S. PATENT DOCUMENTS

2004/0159383 A1*   8/2004   Adamson ............ B60C 23/0433
                                                340/447
2011/0259497 A1   10/2011   Borot et al.
(Continued)

FOREIGN PATENT DOCUMENTS

FR          2937284 A1     4/2010

*Primary Examiner* — Mirza F Alam
(74) *Attorney, Agent, or Firm* — Patterson Intellectual Property Law, PC

(57) ABSTRACT

A tire comprising a tread, a carcass defining an inner cavity, an innerliner layer designed to make sure that the air contained in the inner cavity remains under pressure, and a radio-frequency identification device, which is fixed on a free surface of said innerliner layer. The radio-frequency identification device comprises a transmission assembly comprising at least a RFID chip and an antenna connected to the RFID chip, and a rubber covering structure, which covers the transmission assembly and is fixed on a free surface of the innerliner layer. The rubber covering structure has a stress relaxation modulus $(G_m(0))cs$ smaller than the stress relaxation modulus $(G_m(0))i$ of the innerliner layer.

12 Claims, 1 Drawing Sheet

(56) References Cited

U.S. PATENT DOCUMENTS

| | | | |
|---|---|---|---|
| 2016/0009146 A1* | 1/2016 | Kamada | B60C 17/0009 |
| | | | 152/517 |
| 2022/0161513 A1* | 5/2022 | Ogimoto | H01Q 1/38 |
| 2023/0079114 A1* | 3/2023 | Naruse | B60C 15/06 |
| | | | 152/543 |
| 2023/0202244 A1* | 6/2023 | Naruse | B60C 5/14 |
| | | | 152/450 |

* cited by examiner

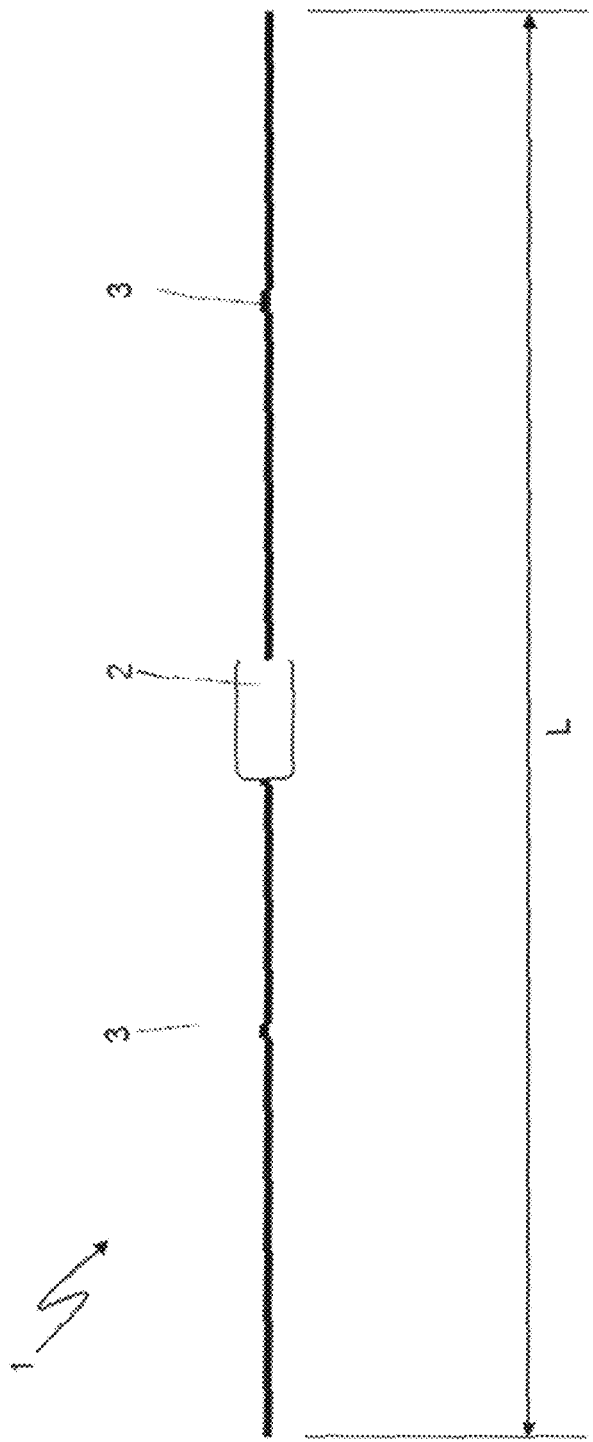

RADIO-FREQUENCY IDENTIFICATION (RFID) DEVICE TO BE INSERTED IN A TIRE

The invention relates to a radio-frequency identification (RFID) device to be inserted in a tire.

In the tire industry, manufacturers have expressed the need for solutions that allow for an automated and unequivocal identification of tires during their production, their use and their disposal.

For example, with specific reference to the production of tires, the automated and unequivocal identification of tires can allow manufacturers to optimize production processes and logistics operations, support the use of automated control systems, carry out an efficient localization/tracking of the tires and, hence, build smart tire factories.

To this regard, the use a radio-frequency identification (RFID) device is known, which is applied to the outer surface of the innerliner layer. Said device consists of a rubber covering structure and of a transmission assembly comprising at least a RFID chip and an antenna connected to the chip, said transmission assembly being arranged inside the covering structure.

The covering structure can comprise one single layer or several layers. For example, the covering structure can consist of one single layer with a cylindrical conformation with the transmission assembly incorporated on the inside, or it can consist of a pair of layers arranged in a sandwich-like manner so as to contain the transmission assembly.

The device described above is affected by a drawback caused by the stresses to which the antenna is subjected during the use of the tire. These stresses are due to the deformations to which the device as a whole and, hence, also the antenna are subjected every time the tire, by rotating, is pressed against the ground in the area of the device. These continuous and repeated stresses can cause a deterioration of the antenna or a separation thereof from the covering structure.

The inventors of this invention studied how the stress exerted upon the antenna relates to the mechanical properties of the antenna and of the rubber covering structure.

Following these studies, the inventors of this invention designed a radio-frequency identification (RFID) device whose technical features are such as to minimize the stresses to which the antenna is subjected during the rotation of the tire.

In particular, the inventors of this invention focused their attention on the viscoelasticity properties of the rubber covering structure. Indeed, stresses are transmitted from the innerliner to the antenna through the rubber covering structure.

Here is an equation providing the distribution of the stress (a) along the coordinate x of the antenna in the moment in which the deformation is applied. The coordinate x represents the distance of a point on the antenna starting from the centre of the antenna.

$$\sigma_f(x, 0) = E_f \varepsilon_0 \left[ 1 - \frac{\cosh(\beta_0(x, r_i))}{\cosh(\beta_0 \zeta)} \right].$$

Wherein Ef is the stiffness of the antenna, $r_i$ indicates the radius of the antenna, $\varepsilon_0$ indicates the extent of the deformation in the moment 0. The subscript "0" following the different quantities indicates the moment 0, namely the quantity relating to the moment in which the deformation takes place.

$\zeta$ and $\beta_0$ are defined as indicated below:

$$\zeta = L/2r_i$$
$$\beta_0 = 2G_m(0)/E_f \ln(R/r_i)$$

Wherein L indicates the length of the antenna, $G_m(0)$ is the stress relaxation modulus of the rubber covering layer and R is the radius of the covering layer.

The description below will start from the assumption that the stiffness of the antenna is expressed by an elastic modulus greater than 10 MPa. However, generally speaking, antennas deemed to be suited for the device according to the invention have an elastic modulus ranging from 15 to 25 MPa.

With the support of the equations shown below, the inventors of the invention identified conditions of the rubber covering layer that are such as to ensure a level of stress exerted upon on the antenna that does not compromise the functionality of the device as a whole. To this regard, the inventors found out that, for the purposes of the invention, it is relevant to assess the relationship between the stress relaxation modulus of the rubber covering layer and the one of the innerliner on which the radio-frequency identification device is fixed. Indeed, as mentioned above, stress is transmitted from the innerliner to the antenna through the rubber covering layers. Therefore, in order to ensure low levels of stress exerted upon the antenna during the use of the tire, the stress relaxation modulus of the rubber covering structure needs to be smaller than the stress relaxation modulus of the innerliner.

The subject-matter of the invention is a tire comprising a tread, a carcass defining an inner cavity, an innerliner layer designed to make sure that the air contained in the inner cavity remains under pressure, and a radio-frequency identification device, which is fixed on a free surface of said innerliner layer; said radio-frequency identification device comprising a transmission assembly comprising at least a RFID chip and an antenna connected to the RFID chip, and a rubber covering structure, which covers said transmission assembly and is fixed on a free surface of said innerliner layer; said tire being characterized in that said covering structure has a stress relaxation modulus $(G_m(0))cs$ smaller than the stress relaxation modulus $(G_m(0))i$ of the innerliner layer.

Preferably, $(G_m(0))cs < 0.7 \times (G_m(0))i$

Said covering structure preferably has a stress relaxation modulus $(G_m(0))cs$ smaller than 6 MPa.

Said antenna preferably has a length ranging from 40 to 100 mm; more preferably from 40 to 60 mm.

Said antenna preferably has an elastic modulus greater than or equal to 10 Mpa; more preferably ranging from 10 to 25 MPa.

A further subject-matter of the invention is a radio-frequency identification device designed to be fixed on a free surface of an innerliner layer of a tire; said device comprising a transmission assembly comprising at least a RFID chip and an antenna connected to the RFID chip, and a rubber covering structure, which covers said transmission assembly; said device being characterized in that said covering structure has a stress relaxation modulus $(G_m(0))cs$ smaller than 6 MPa.

The conditions of the antenna (length and elastic modulus) help obtain a radio-frequency identification device capable of preserving its functionality even following the use of the tire and, hence, following the repeated deformations to which the device is subjected.

Embodiments of the invention will be described hereinafter with an explanatory and non-limiting purpose, with the aid of the attached FIGURE.

FIG. 1 is a schematic diagram representing a transmission assembly according to the invention.

The transmission assembly 1 comprises a RFID chip 2 and an antenna 3 connected to the RFID chip 2.

Three rubber compounds for the production of a covering layer were taken into account. Each one of the covering layers was applied to different transmission assemblies differing from one another only in terms of length (L) and elastic modulus (Ef) of the antenna 3.

In particular, of the three compounds described below, two of them (A and B) are comparison compounds and one of them (C) is a compound according to the invention. One of the two comparison compounds (A) belongs to the innerliner layer. This proves that the transmission assembly of the device cannot be directly incorporated inside the innerliner layer.

Table I shows the phr compositions of the three compounds and, for each compound, the calculated values of the stress relaxation modulus $G_m(0)$. The values of the stress relaxation modulus $G_m(0)$ were calculated according to the ISO6914 standard.

TABLE I

|  | A | B | C |
|---|---|---|---|
| Natural rubber | — | 100 | 100 |
| Bromo-butyl rubber | 100 | — | — |
| Carbon black N330 | — | 50 | — |
| Carbon black N660 | 50 | — | 50 |
| Calcium carbonate | 20 | — | — |
| Sulphur | 1 | 5 | 5 |
| Zinc oxide | 3 | 6 | 6 |
| MBTS | 2 | 1 | 1 |
| CBS | 0 | 1 | 1 |
| 6PPD | 0.5 | 0.5 | 0.5 |
| Stearic acid | 2 | 2 | 2 |
| RAE oil | 12 | 12 | 12 |
| $G_m(0)$ | 7.04 | 17.62 | 4.63 |

The stress (σ) to which the antenna was subjected was calculated depending on the compound used for the covering layer and depending on the type of antenna used. In particular, the antennas of the different transmission assemblies differ from one another in length (L) and elastic modulus (Ef).

The covering layer was assumed to be a cylinder in which, along its axis, the antenna is placed.

$r_i$ is assumed to be equal to 1 mm, R is assumed to be equal to 2 mm and so is assumed to be equal to 15%.

Table II shows the values of σ depending on the compound of the covering layer and on the type of antenna. Values of σ were calculated in the vicinities of antenna ends; specifically at a distance from the ends equal to 5% of the length (L) of the antenna.

TABLE II

| Length of the antenna (L) | Ef(MPa) |  | A | B | C |
|---|---|---|---|---|---|
| 60 | 16.3 | σ (MPa) | 2.33 | 2.42 | 2.24 |
|  |  | σ (%) | 100 | 104 | 96 |
|  | 10.0 | σ (MPa) | 1.47 | 1.49 | 1.43 |
|  |  | σ (%) | 100 | 101 | 97 |

TABLE II-continued

| Length of the antenna (L) | Ef(MPa) |  | A | B | C |
|---|---|---|---|---|---|
|  | 25.0 | σ (MPa) | 3.44 | 3.67 | 3.25 |
|  |  | σ (%) | 100 | 107 | 94 |
| 40 | 16.3 | σ (MPa) | 1.92 | 2.23 | 1.74 |
|  |  | σ (%) | 100 | 116 | 91 |
|  | 10.0 | σ (MPa) | 1.29 | 1.43 | 1.19 |
|  |  | σ (%) | 100 | 111 | 92 |
|  | 25.0 | σ (MPa) | 2.67 | 3.23 | 2.38 |
|  |  | σ (%) | 100 | 121 | 89 |
| 100 | 16.3 | σ (MPa) | 2.33 | 2.42 | 2.24 |
|  |  | σ (%) | 100 | 104 | 96 |
|  | 10.0 | σ (MPa) | 1.47 | 1.49 | 1.43 |
|  |  | σ (%) | 100 | 101 | 97 |
|  | 25.0 | σ (MPa) | 3.44 | 3.67 | 3.25 |
|  |  | σ (%) | 100 | 107 | 94 |

The values shown in Table II clearly reveal that, in case the covering layer is manufactured with a compound with a stress relaxation module according to the invention, the stress undergone by the antenna, given the same deformation, is significantly smaller.

As a person skilled in the art can clearly understand, the stress values indicated for the covering layer according to the invention are such as to ensure the integrity of the antenna as well as the stability of the coupling thereof to the rubber covering layer and, as a consequence, the functionality of the device as a whole.

On the contrary, the stress calculated taking into account the compounds A and B for the covering layer turns out to be too high and not capable of ensuring the functionality of the device during the use of the tire. In particular, the stress values detected with covering structure manufactured with the innerliner compound (A) show that the transmission assembly cannot be directly inserted in the innerliner.

Finally, contrary to what discussed above, the device can comprise a covering structure which, instead of consisting of a cylinder-shaped rubber layer, consists of two rubber layers arranged in a sandwich-like manner and housing between them the transmission assembly.

The invention claimed is:

1. A tire comprising:
   a tread;
   a carcass defining an inner cavity;
   an innerliner layer configured to ensure that air contained in the inner cavity remains under pressure; and
   a radio-frequency identification (RFID) device, which is fixed on a free surface of the innerliner layer, and comprises
   a transmission assembly comprising at least an RFID chip and an antenna connected to the RFID chip, and
   a rubber covering structure, which covers the transmission assembly and is fixed on a free surface of the innerliner layer,
   wherein the rubber covering structure has a stress relaxation modulus smaller than a stress relaxation modulus of the innerliner layer.

2. The tire of claim 1, characterized in that the stress relaxation modulus of the rubber covering structure is <0.7× the stress relaxation modulus of the innerliner layer.

3. The tire of claim 1, wherein the rubber covering structure has a stress relaxation modulus smaller than 6 MPa.

4. The tire of claim 1, wherein the antenna has a length ranging from 40 mm to 100 mm.

5. The tire of claim 4, wherein the antenna has a length ranging from 40 mm to 60 mm.

6. The tire of claim 1, wherein the antenna has an elastic modulus greater than or equal to 10 MPa.

7. The tire of claim 6, wherein the antenna has an elastic modulus ranging from 10 MPa to 25 MPa.

8. A radio-frequency identification (RFID) device designed to be fixed on a free surface of an innerliner layer of a tire, the RFID device comprising:
- a transmission assembly comprising at least an RFID chip and an antenna connected to the RFID chip; and
- a rubber covering structure which covers said transmission assembly and is fixed on the free surface of the innerliner layer of the tire;
- wherein the rubber covering structure has a stress relaxation modulus smaller than 6 MPa.

9. The RFID device of claim 8, wherein the antenna has a length ranging from 40 mm to 100 mm.

10. The RFID device of claim 9, wherein the antenna has a length ranging from 40 mm to 60 mm.

11. The RFID device of claim 8, wherein the antenna has an elastic modulus greater than or equal to 10 MPa.

12. The RFID device of claim 11, wherein the antenna has an elastic modulus ranging from 10 to 25 MPa.

\* \* \* \* \*